US008566425B1

(12) United States Patent
Srinivasaiah

(10) Patent No.: US 8,566,425 B1
(45) Date of Patent: Oct. 22, 2013

(54) IDENTIFYING SOCIAL PROFILES OF ENTITIES

(75) Inventor: Manjunath Srinivasaiah, New York, NY (US)

(73) Assignee: Google Inc., Mountain View, CA (US)

( * ) Notice: Subject to any disclaimer, the term of this patent is extended or adjusted under 35 U.S.C. 154(b) by 281 days.

(21) Appl. No.: 13/017,596

(22) Filed: Jan. 31, 2011

(51) Int. Cl.
*G06F 15/16* (2006.01)

(52) U.S. Cl.
USPC ........... 709/219; 709/203; 709/206; 709/224; 707/728

(58) Field of Classification Search
USPC ........... 709/203, 206, 224; 707/722–723, 728
See application file for complete search history.

(56) References Cited

U.S. PATENT DOCUMENTS

| | | | | |
|---|---|---|---|---|
| 2009/0287698 A1* | 11/2009 | Marmaros et al. | 707/5 |
| 2011/0055400 A1* | 3/2011 | Alexander | 709/226 |
| 2011/0060751 A1* | 3/2011 | English et al. | 707/758 |
| 2011/0099464 A1* | 4/2011 | Marashi et al. | 715/208 |

OTHER PUBLICATIONS

"Restaurants NYC—Google Search" [online]. [Retrieved Dec. 22, 2010]. [Retrieved from the internet: <http://www.google.com/search?tbs=mbl:1&hl=en&source=hp&q=restaurants+nyc>, 2 pages.

* cited by examiner

*Primary Examiner* — Wing F Chan
*Assistant Examiner* — Hitesh Patel
(74) *Attorney, Agent, or Firm* — Lerner, David, Littenberg, Krumholz & Mentlik, LLP

(57) ABSTRACT

A server may scan an entity's or business' web page to identify information linking to one or more social networking web sites associated with the entity. The server may receive a request from a client device for information about the entity, specifically, a request to view an entity's place page. A place page may provide various types of information to users, for example, by displaying information about the particular entity such as user reviews, contact information, etc. In response to the request, the server may include the entity's social networking web site with the place page information provided to the client device. The server may also access the identified social networking web site in order to identify content such as coupons or other offers recently provided by the entity on the web site. This identified content may also be included in the place page provided to the requesting client device.

14 Claims, 11 Drawing Sheets

300

400

500

600

800

900

IDENTIFYING SOCIAL PROFILES OF ENTITIES

BACKGROUND OF THE INVENTION

Various network-based search applications allow a user to enter search terms and receive a list of search results. The systems use numerous different types of ranking algorithms to ensure that the search results are relevant to the user's query. For example, some systems may provide a user with search results based on the relevance of the results, the reliability and safety of the results, location of the user and the results, etc.

In another example, other systems may provide a list of businesses or other entities based on the location of the user or some location context provided in the search terms. For example, the user may search for a business name and a city and receive a list of search results based on their location (proximity to the provided city) and relevance to the business name. If the list of search results includes, for example, a business listing, the server may also provide the user with a link to a web site designated as the business's "place page". A place page may contain various types of information, such as contact information, hours, user reviews, etc. related to the business.

In addition to maintaining an "official" web site, recently, some businesses (and other entities) have made efforts to draw and maintain customers by utilizing various social network web sites. Businesses now operate accounts or "social profile pages" on social networking web sites such as Twitter, YouTube, Facebook, LinkedIn, FourSquare, MySpace, and Google's Buzz, among others. These social networking web sites allow businesses to "post" and share information immediately with customers who have previously indicated an interest in the business, for example, by signing up to follow the business' social profile page. At least some businesses provide time-sensitive content such as coupons or notices of sales by posting the information on the business's social profile page.

BRIEF SUMMARY OF THE INVENTION

Aspects of the invention relate generally to identifying social profiles of businesses. More specifically, a server may scan an entity's or business' web page to identify information linking to one or more social profiles or social networking web site locations. This information may be associated with the entity's listing information and stored by the server. The server may receive a request from a client device for information about the entity, specifically, a request to view an entity's place page. A place page may provide various types of information to users, for example, by displaying information about the particular entity such as user reviews, contact information, etc. The server may include the entity's social networking web site with the place page information provided to the client device. The server may also access the identified social networking web site in order to identify content such as coupons or other offers recently provided by the entity on the web site. This identified content may also be included in the place page provided to the requesting client device. This may allow the server to provide the client device with near real time information directed to the entity.

One aspect of the invention provides a computer-implemented method. The method includes accessing entity information identifying a plurality of entities, each of the plurality of entities being associated with a respective web address; selecting, by a processor, a given entity of the plurality of entities using the entity information; requesting, from a web server, the respective web address associated with the given entity; receiving data associated with the respective web address, the data including a hyperlink to a second web address; accessing a list of social networking terms used in web site addresses of one or more social networking web sites; the processor determining whether the received hyperlink includes a given term of the list of social networking terms; if the received hyperlink includes the given term, identifying the received hyperlink as a first social networking address; associating the first social networking address with the given entity; and storing the association in memory accessible by the processor.

In one example, the method also includes receiving a request, from a client device, for a place page identifying information about the given entity; retrieving, from the memory, the first social networking address associated with the given entity; requesting the first social networking address from a second web server; receiving data associated with the second web address, the received data including content associated with the given entity; and generating the place page based on the entity information associated with the given entity and the content associated with the given entity. In another example, the method also includes identifying a title of the given entity based on the received hyperlink; selecting a format from a list of web address formats used by one or more social networking web sites; generating a third web address for the given entity based on the selected format; if the third web address exists: (1) identifying the third web address as a second social networking address; (2) associating the second social networking address with the given entity; and (3) storing the association in memory. In another example, the method also includes receiving a request, from a client device, for a place page identifying information about the given entity; identifying the second social networking address associated with the given entity; requesting the second social networking address from a second web server; receiving data associated with the second web address, the received data including second content associated with the given entity; and generating the place page based on the entity information associated with the given entity and the second content. In another example, the method also includes receiving a request, from a client device, for a place page identifying information about the given entity; retrieving, from the memory, the first social networking address associated with the given entity; requesting the first social networking address from a second web server; identifying the second social networking address associated with the given entity; requesting the second social networking address from a second web server; receiving data associated with the first web address, the received data including first content associated with the given entity; receiving data associated with the second web address, the received data including second content associated with the given entity; and generating the place page based on the entity information associated with the given entity, and the first content, and the second content.

Another aspect of the invention provides a computer. The computer includes memory storing entity information identifying a plurality of entities, each of the plurality of entities being associated with a respective web address. The memory also storing a list of social networking terms used in web site addresses of one or more social networking web sites; select a given entity of the plurality of entities using the entity information; request, from a web server, the respective web address associated with the given entity; receive data associated with the respective web address, the data including a hyperlink to a second web address; determine whether the received hyperlink includes a given term of the list of social networking terms; if the received hyperlink includes the given term, identify the received hyperlink as a first social networking address; associate the first social networking address with the given entity; and store the association in the memory.

In one example, the processor is also operable to receive a request, from a client device, for a place page identifying information about the given entity; retrieve, from the memory, the first social networking address associated with the given entity; request the first social networking address from a second web server; receive data associated with the second web address, the received data including content associated with the given entity; and generate the place page based on the entity information associated with the given entity and the content associated with the given entity. In another example, the processor is also operable to identify a title of the given entity based on the received hyperlink; select a format from a list of web address formats used by one or more social networking web sites; generate a third web address for the given entity based on the selected format; if the third web address exists: (1) identify the third web address as a second social networking address; (2) associate the second social networking address with the given entity; and (3) store the association in memory. In another example, the processor is also operable to receive a request, from a client device, for a place page identifying information about the given entity; identify the second social networking address associated with the given entity; request the second social networking address from a second web server; receive data associated with the second web address, the received data including second content associated with the given entity; and generate the place page based on the entity information associated with the given entity and the second content. In another example, the processor is also operable to receive a request, from a client device, for a place page identifying information about the given entity; retrieve, from the memory, the first social networking address associated with the given entity; request the first social networking address from a second web server; identify the second social networking address associated with the given entity; request the second social networking address from a second web server; receive data associated with the first web address, the received data including first content associated with the given entity; receive data associated with the second web address, the received data including second content associated with the given entity; and generate the place page based on the entity information associated with the given entity, and the first content, and the second content.

DETAILED DESCRIPTION

Figure 1:
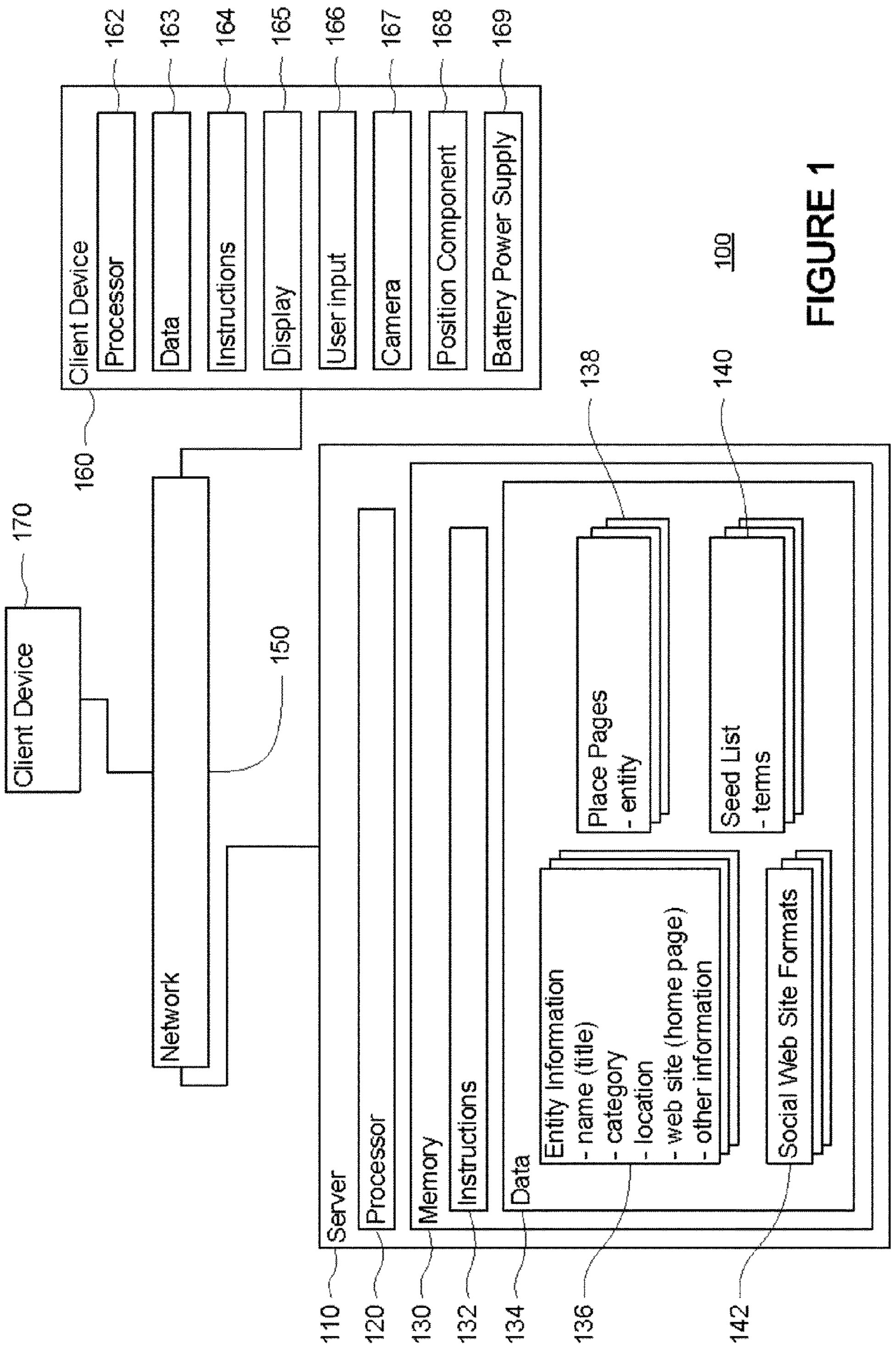
FIG. 1 is a functional diagram of a system in accordance with an aspect of the invention.
Figure 2:
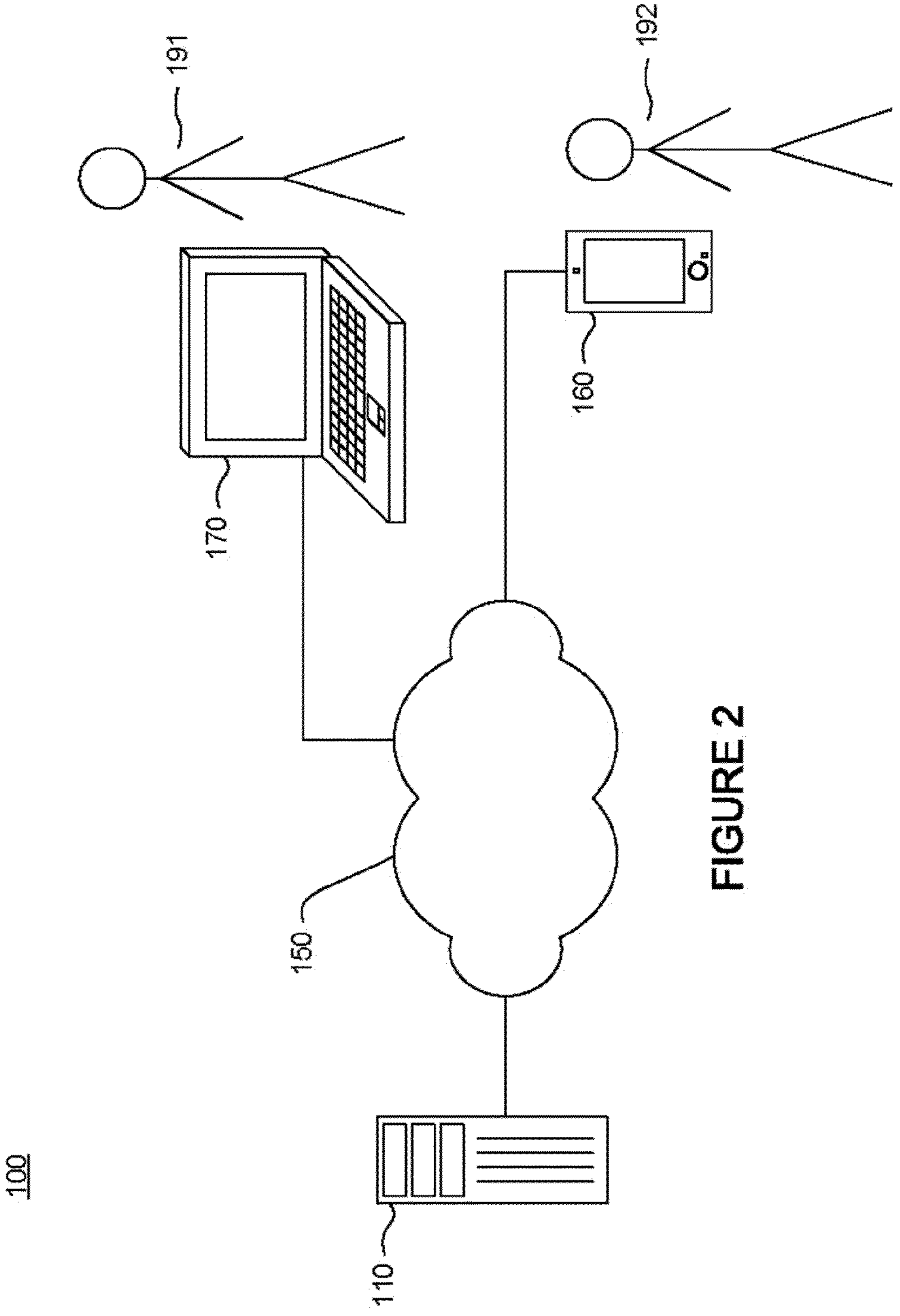
FIG. 2 is a pictorial diagram of a system in accordance with an aspect of the invention.

As shown in FIGS. 1-2, a system 100 in accordance with one aspect of the invention includes a computer 110 containing a processor 120, memory 130 and other components typically present in general purpose computers.

The memory 130 stores information accessible by processor 120, including instructions 132, and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, flash drive, ROM, RAM, DVD or other optical disks, as well as other write-capable and read-only memories. In that regard, memory may include short term or temporary storage as well as long term or persistent storage. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the architecture is not limited by any particular data structure, the data may be stored in computer registers, in a relational database as a table having a plurality of different fields and records, XML documents or flat files. The data may also be formatted in any computer-readable format. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as processors from Intel Corporation or Advanced Micro Devices. Alternatively, the processor may be a dedicated controller such as an ASIC. Although FIG. 1 functionally illustrates the processor and memory as being within the same block, it will be understood by those of ordinary skill in the art that the processor and memory may actually comprise multiple processors and memories that may or may not be stored within the same physical housing. For example, memory may be a hard drive or other storage media located in a server farm of a data center. Accordingly, references to a processor, computer, or memory will be understood to include references to a collection of processors, computers, or memories that may or may not operate in parallel.

The computer 110 may be at one node of a network 150 and capable of directly and indirectly receiving data from other nodes of the network. For example, computer 110 may comprise a web server that is capable of receiving data from client devices 160 and 170 via network 150 such that server 110 uses network 150 to transmit and display information to a user on display 165 of client device 170. Server 110 may also comprise a plurality of computers that exchange information with different nodes of a network for the purpose of receiving, processing and transmitting data to the client devices. In this instance, the client devices will typically still be at different nodes of the network than any of the computers comprising server 110.

Network 150, and intervening nodes between server 110 and client devices, may comprise various configurations and use various protocols including the Internet, World Wide Web, intranets, virtual private networks, local Ethernet networks, private networks using communication protocols proprietary to one or more companies, cellular and wireless networks (e.g., WiFi), instant messaging, HTTP and SMTP, and various combinations of the foregoing. Although only a few computers are depicted in FIGS. 1-2, it should be appreciated that a typical system can include a large number of connected computers.

Each client device may be configured similarly to the server 110, with a processor, memory and instructions as described above. Each client device 160 or 170 may be a personal computer intended for use by a person 191-192, and have all of the components normally used in connection with a personal computer such as a central processing unit (CPU) 162, memory (e.g., RAM and internal hard drives) storing data 163 and instructions 164, an electronic display 165 (e.g., a monitor having a screen, a touch-screen, a projector, a television, a computer printer or any other electrical device that is operable to display information), end user input 166 (e.g., a mouse, keyboard, touch-screen or microphone). The client device may also include a camera 167, accelerometer, speakers, a network interface device, a battery power supply 169 or other power source, and all of the components used for connecting these elements to one another.

As shown in FIG. 1, the client devices may also include geographic position component 168, to determine the geographic location and orientation of the device. For example, client device 170 may include a GPS receiver to determine the device's latitude, longitude and altitude position. Thus, as the client device changes location, for example by being physically moved, the GPS receiver may determine a new current location. The component 168 may also comprise software for determining the position of the device based on other signals received at the client device 170, such as signals received at a cell phone's antennas from one or more cell phone towers if the client device is a cell phone.

Although the client devices 160 and 170 may each comprise a full-sized personal computer, they may alternatively comprise mobile devices capable of wirelessly exchanging data, including position information derived from position component 168, with a server over a network such as the Internet. By way of example only, client device 160 may be a wireless-enabled PDA or a cellular phone capable of obtaining information via the Internet. The user may input information using a small keyboard (in the case of a Blackberry-type phone), a keypad (in the case of a typical cellular phone) or a touch screen (in the case of a PDA).

Data 134 of server 110 may include entity information 136 identifying local businesses, clubs, or other objects or features associated with particular geographic locations. For example, an entity may be associated with a name (such as a company's name), a category (such as "pizza", "Italian restaurant" or "ballpark"), a geographic location (such as "123 Main Street" or latitude and longitude), a web site or home page for the entity, and various other types of information. An entity may also be associated with user reviews, images, phone numbers, and/or links to additional information pages. The entity information may be compiled, for example, by automatically gathering information from a number of different sources such as an entity's web sites, telephone or business directories, or other content sources.

The server may also have access to place pages 138. As described above, a place page may provide various types of information to users, for example, by displaying all or a portion of the entity information associated with a particular entity.

Figure 3:
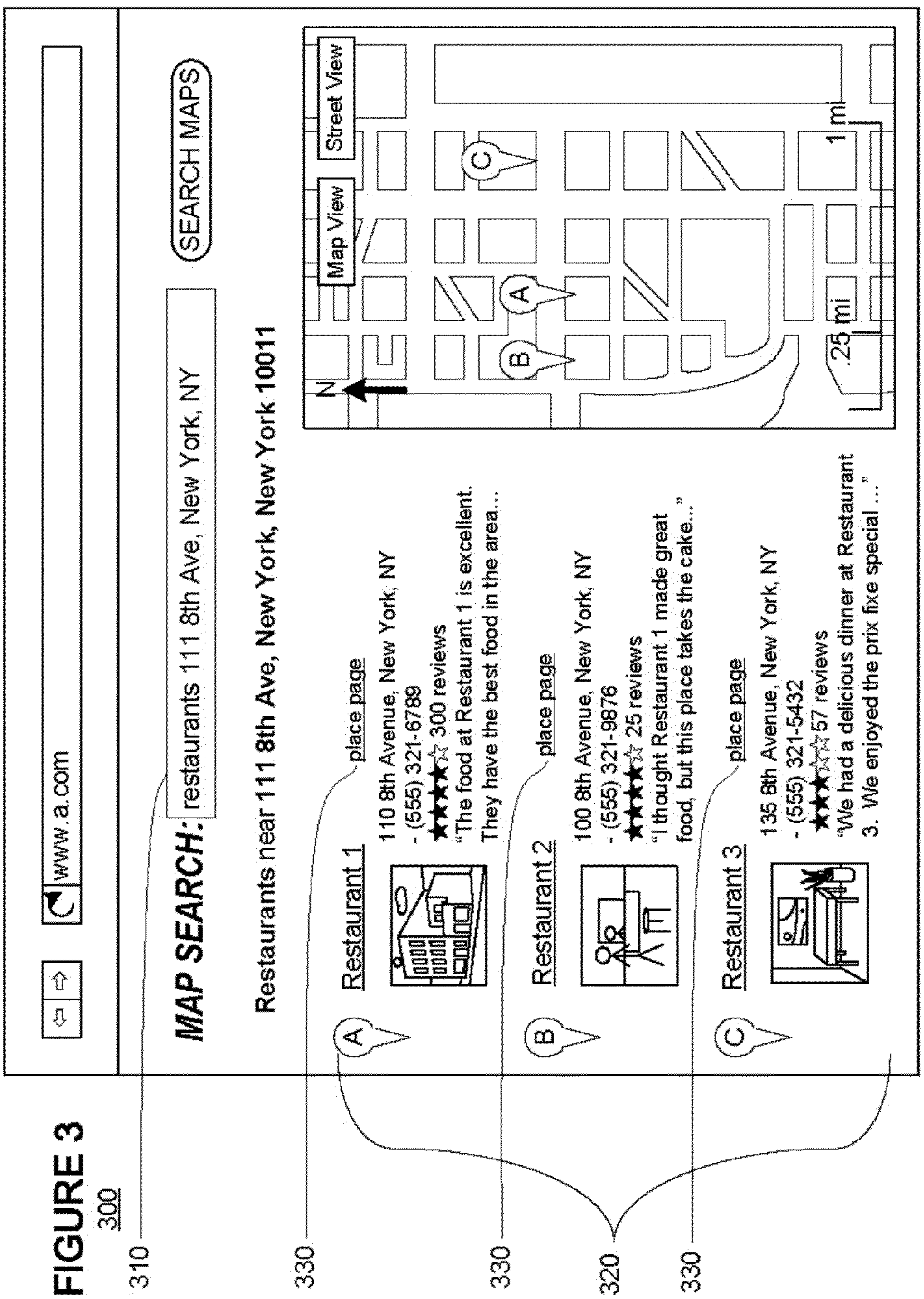
FIG. 3 is an exemplary screen shot in accordance with an aspect of the invention.

Users may request an entity's place page in order to view information about the entity. For example, as shown in exemplary screen shot 300 of FIG. 3, if a user conducts a map search for the query "restaurants 111 8th Ave, New York, N.Y." (query 310) the server may provide the user with a list of search results 320. Each of the search results may include listing information identifying an entity (for example, Restaurant 1, Restaurant 2, or Restaurant 3), contact information, and various related information. Each listing may also be associated with a link 330 to a place page that provides users with additional information about the entity.

Figure 4:
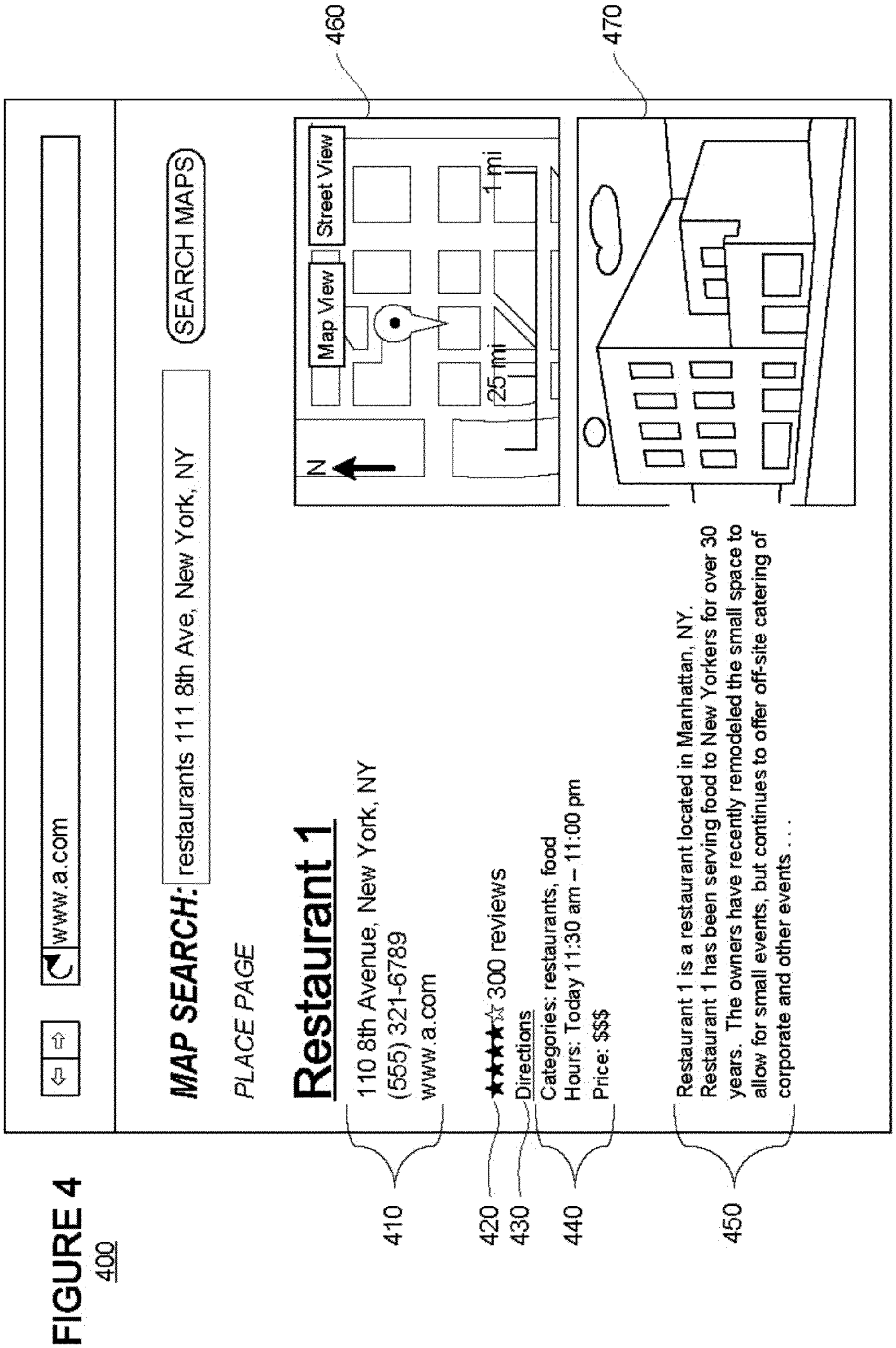
FIG. 4 is an exemplary screen shot in accordance with an aspect of the invention.

The exemplary place page shown in exemplary screen shot 400 of FIG. 4 may, for example, be transmitted to the requesting client device for display to the user. The place page may, provide general information 410 about the business as well as sample review data 420; hyperlinks to direction information 430; details 440 about the business such as hours, prices or categories; a summary of the business 450; a map 460; and one or more relevant photos 470 identified from entity information 138.

Returning to FIG. 1, the server may also have access to a seed list 140 of social networking terms. The seed list may be generated manually and may include various terms used by social networking web sites in the web addresses of its users. For example, seed list 140 may include the terms "twitter," "youtube," "facebook," "linkedin," "foursquare," "myspace," and "buzz," which in these examples signify social networking sites." For exemplary purposes, the term "socialwebsite" will be used in the description below as a seed term. As will be described in more detail below, these terms may be used to identify a social networking web site associated with a particular entity.

In addition to seed terms, the server may also access social web site formats for various social networking web sites. Similar to seed list 140, web address formats 142 may also be generated manually. For example, an exemplary social networking web site "SocialWebsite" may use the format "www.a.com/socialwebsite/entity." Where "entity" defines an entity's social networking profile or web site. For example, an entity with the name "Business A" may operate a social networking web site at "www.a.com/socialwebsite/businessa," "www.a.com/socialwebsite/yourbusinessa," or "www.a.com/socialwebsite/nycbusinessa." It will be understood that the examples herein have been simplified for ease of understanding, but these formats and web addresses may in actuality be much simpler or more complicated. As will be described in more detail below, these formats may be used to identify a social networking web site associated with a particular entity.

Various operations in accordance with aspects of the invention will now be described. It should also be understood that the following operations do not have to be performed in the precise order described below. Rather, various steps can be handled in a different order or simultaneously.

The server may select an entity and examine the entity's web site. For example, the entity information may identify a plurality of businesses and respective web sites. The server may select "Restaurant 1" and its respective web site "www.a.com." Once selected, the server may request the web site from a web server associated with the web site. For example, if the server requests "www.a.com," the server may receive the information displayed in FIG. 5. For example, exemplary screen shot 500 of FIG. 5 includes various information about Restaurant 1 as well as hyperlinks 510 to other web pages of Restaurant 1's web site as well as hyperlink 520 to another web site.

The server may then scan the received information in order to identify any hyperlinks. For example, as shown in exemplary screen shot 600 FIG. 6, the server may identify hyperlinks 610 and 620 included in Restaurant 1 web site's home page. In one example, hyperlink 610 may link to the web site www.a.com/restaurant1/menu, whereas hyperlink 620 may link to the web site www.a.com/socialwebsite/restaurant1. It will be understood that the server may simply scan the information included in an entity's home page of a web site or in addition, scan the information included on other page of the entity's web site.

Once a hyperlink has been identified, the server may use the seed list to determine whether a hyperlink identifies a social networking web page. The server may examine hyperlink 610 and determine that it does not include any of the terms of the seed list. As noted above, the term "socialwebsite" as used herein is an exemplary seed term and is also included in hyperlink 620. Accordingly, the server may determine that hyperlink 620 is indeed a social networking web site. The server may review the hyperlinks to determine whether any of the additional terms of the seed list are included in the hyperlinks and accordingly, whether any of the hyperlinks are links to a social networking web site.

Alternatively, the server may use the web site formats described above to determine whether a hyperlink identifies a social networking web page. For example, returning to the exemplary social networking web site "SocialWebsite" the server may scan the hyperlink information to determine whether any of the hyperlinks use the format "www.a.com/socialwebsite/entity." If so, as in the example of hyperlink 620, the server may determine that this hyperlink is indeed a social networking web site. Again the server may review the hyperlinks to determine whether any of the additional web site formats are included in the hyperlinks and accordingly, whether any of the hyperlinks are links to a social networking web site.

Figure 5:
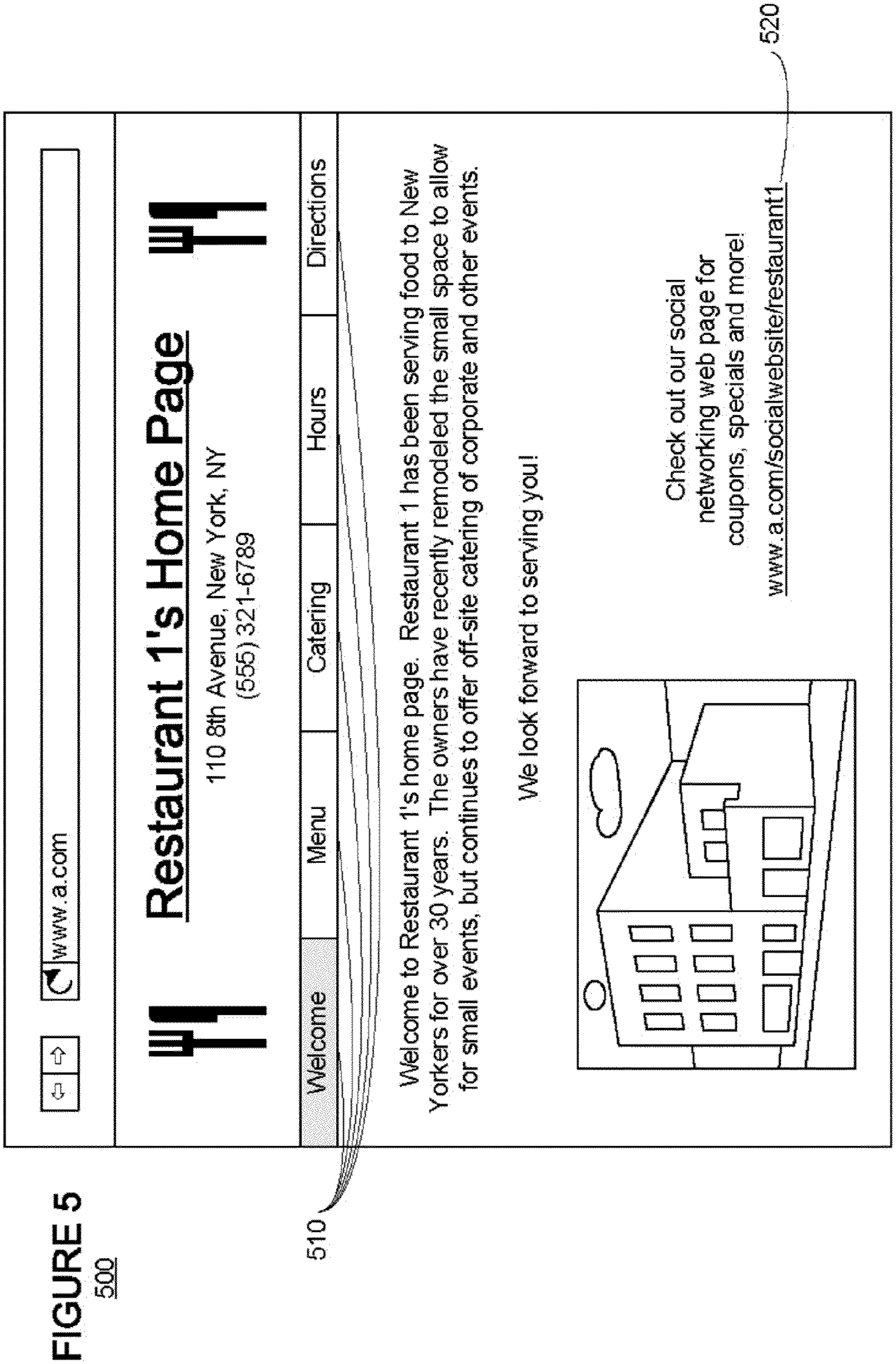
FIG. 5 is an exemplary screen shot in accordance with another aspect of the invention.
Figure 6:
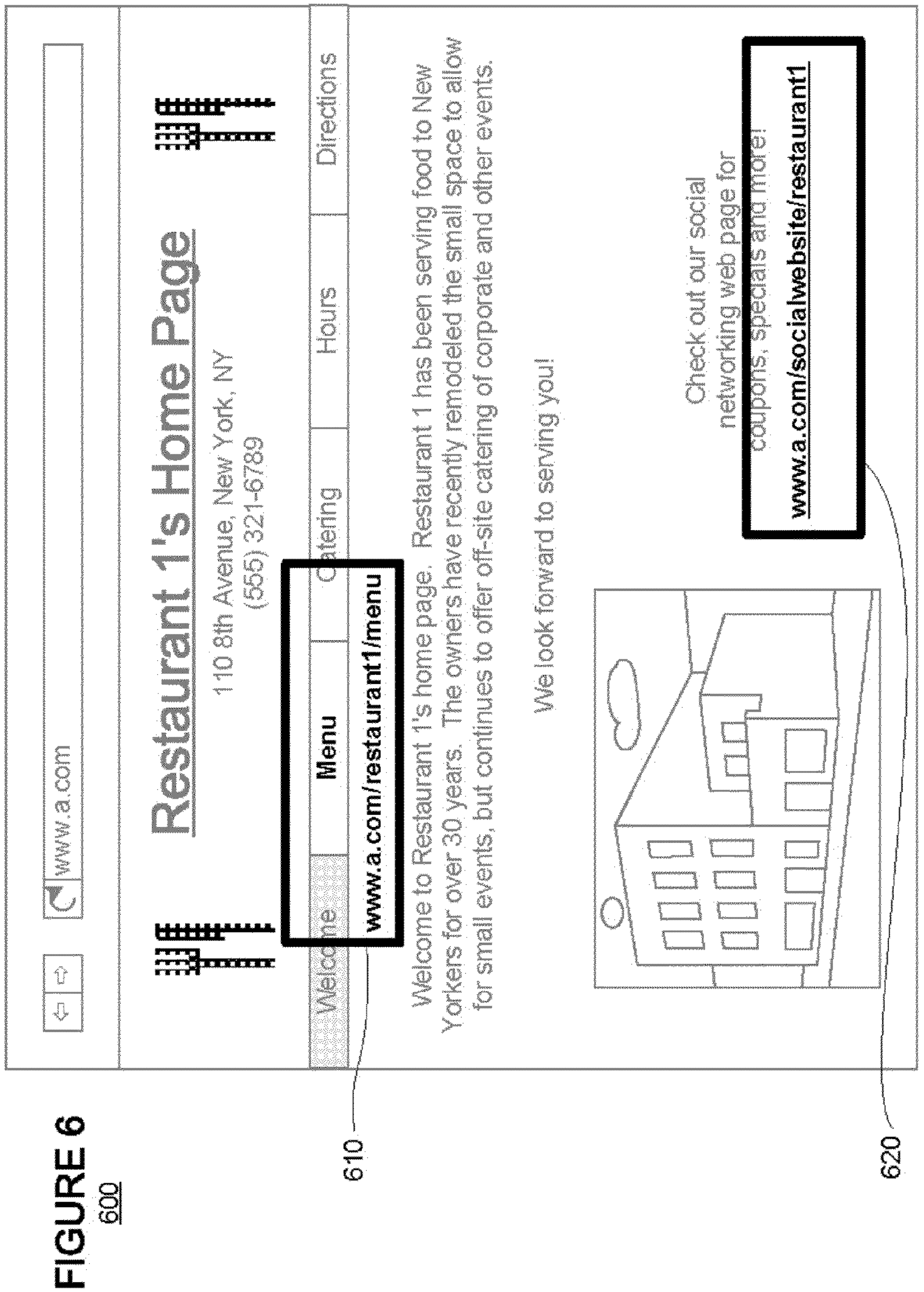
FIG. 6 is an exemplary screen shot in accordance with a further aspect of the invention.

Although the information of FIGS. 5 and 6 is displayed in a screen shot, it will be understood that this is merely an exemplary representation of the information for explanatory purposes. The server may receive the information, but need not display it as shown in the figure order to scan the information and identify hyperlinks as described above.

Once the server has identified a hyperlink on an entity's web site as a link to a social networking web site, the server may associate the identified hyperlink with the entity's entity information and store the association in memory. Therefore, using the example above, the server may associate hyperlink 620 with the entity information of Restaurant 1 and store this association in memory.

Figure 7:
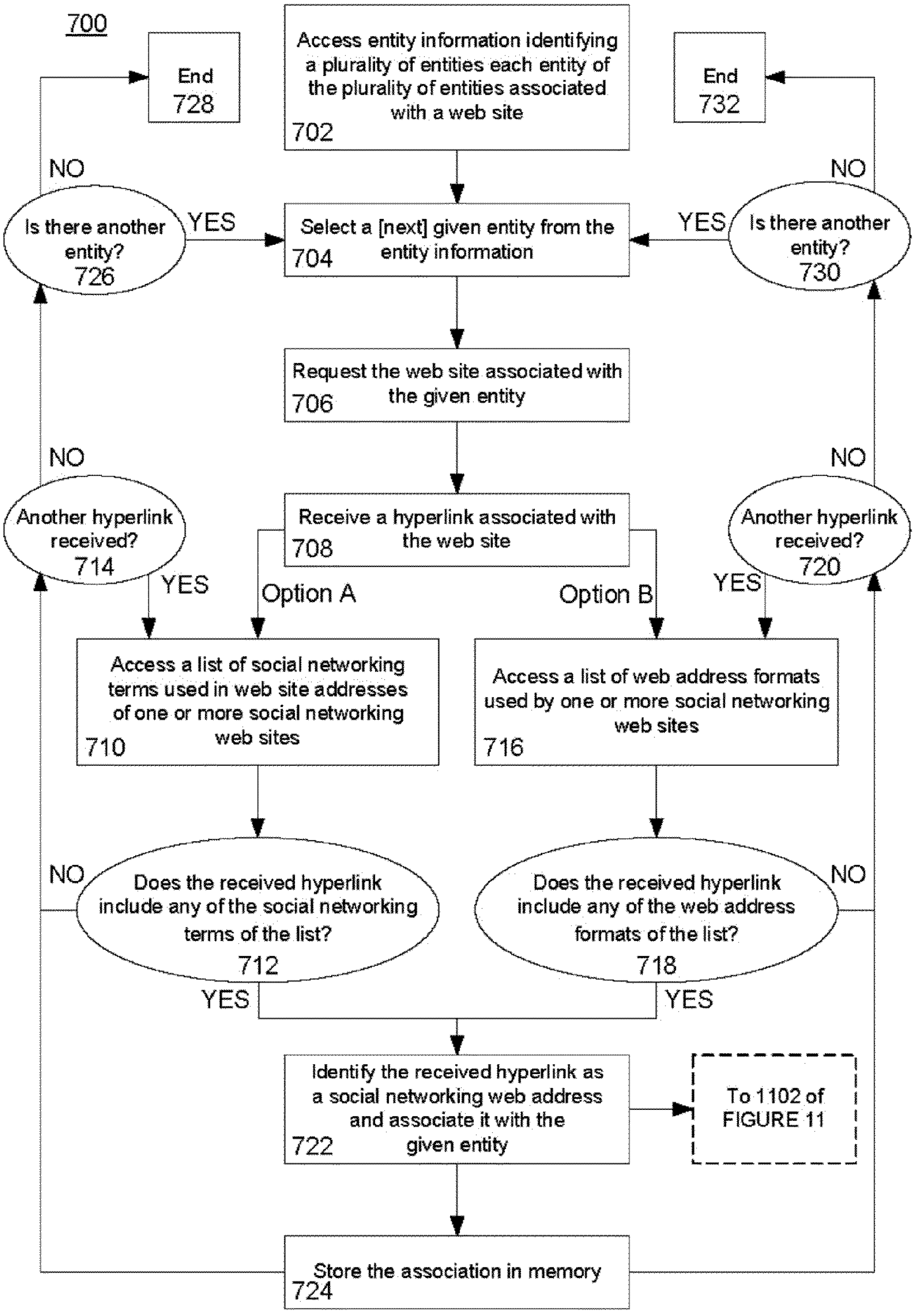
FIG. 7 is an exemplary screen shot in accordance with yet another aspect of the invention.

For example, as shown in flow diagram 700 of FIG. 7, the server accesses entity information identifying a plurality of entities at block 702. Each entity of the plurality of entities being associated with a web site. The server selects a given entity from the plurality of entities of the entity information at block 704. The server then requests the web site associated with the given entity from, for example, a web server associated with the web site at block 706. In response, the server receives a hyperlink associated with the web site, or a hyperlink included in the web site for display to a user at block 708.

In one example, following option A, the server accesses a list of social networking terms used in web site addresses of one or more social networking web sites at block 710. The server then determines whether the received hyperlink includes any of the social networking terms of the list at block 712. If not, the server continues to block 714 to determine if there are additional received hyperlinks associated with the web site. If there are no additional received hyperlinks, the server then determines whether there is another entity of the list of entities which has not yet been examined (see e.g. blocks 710 and 716) at block 726. If so, the server returns to block 704 and selects the next given entity from the entity information. If there are no entities which have not been examined, the process ends at block 728.

Returning to block 714, if there is another received hyperlink, the server continues the process at block 710. If there are no additional hyperlinks, the server returns to block 704 to select the next entity from the entity information and continue to request the web site associated with the next entity as described above at block 706. Returning to block 712, if the received hyperlink does include a social networking term of the list, the server then identifies the received hyperlink as a social networking web address and associates it with the given entity at block 722. The server stores the association in memory at block 724. Then, the process continues to block 714, and the server determines whether another hyperlink has been received.

In another example, returning to block 708 and following option B, the server accesses a list of web address formats used by one or more social networking web sites at block 716. The server then determines whether the received hyperlink includes a web address format of the list of web address formats at block 718. If not, the server continues to block 720 to determine if there are additional received hyperlinks associated with the web site. If there are no additional received hyperlinks, the server then determines whether there is another entity of the list of entities which has not yet been examined (see e.g., blocks 710 and 716) at block 730. If so, the server returns to block 704 and selects the next given entity from the entity information. If there are no entities which have not been examined, the process ends at block 732.

Returning to block 720, if there is another hyperlink, the server continues the process at block 716. If there are no additional hyperlinks, the server returns to block 704 to select the next entity from the entity information and continue to request the web site associated with the next entity as described above at block 706. Returning to block 718, if the received hyperlink does include a web address formal of the list of web address formats, the server then identifies the received hyperlink as a social networking web address and associates it with the given entity at block 722. The server stores the association in memory at block 724. Then, the process continues to block 720, and the server determines whether another hyperlink has been received.

The server may receive a request for a place page associated with a particular entity from a client device, and in response, the server may identify an associated social networking web site. For example, returning to the example of FIG. 3, the server may receive a request for information including query 310, "restaurants 111 8th Ave, New York, N.Y." In response, the server may provide the user with the list of search results 320. If the user selects hyperlink 330 which directs the user to the place page of Restaurant 1, the server may in turn receive a request from the user's client device for Restaurant 1's place page. In response, the server may identify the social networking web site, or hyperlink 620 of FIG. 6, previously associated with the entity information of Restaurant 1.

The server may then access the web site of the hyperlink in order to identify content related to the entity. In one example, a social networking web site may provide information posted by restaurant owners in addition to other posts by other users or entities. The web site may provide APIs/RSS feeds of all of the data posted. Many of the posts will be displayed as provided by the user after some preliminary filtering for spam, etc. This information may be used as the "content" described herein.

The content may be identified on demand, for example, in response to a user request, or the content may be identified in advance, for example, with a pre-determined frequency. Identifying the content and associating it with a place page in advance of a request for the place page may be more efficient may provide the service with additional time to review the content for relevancy.

Figure 8:
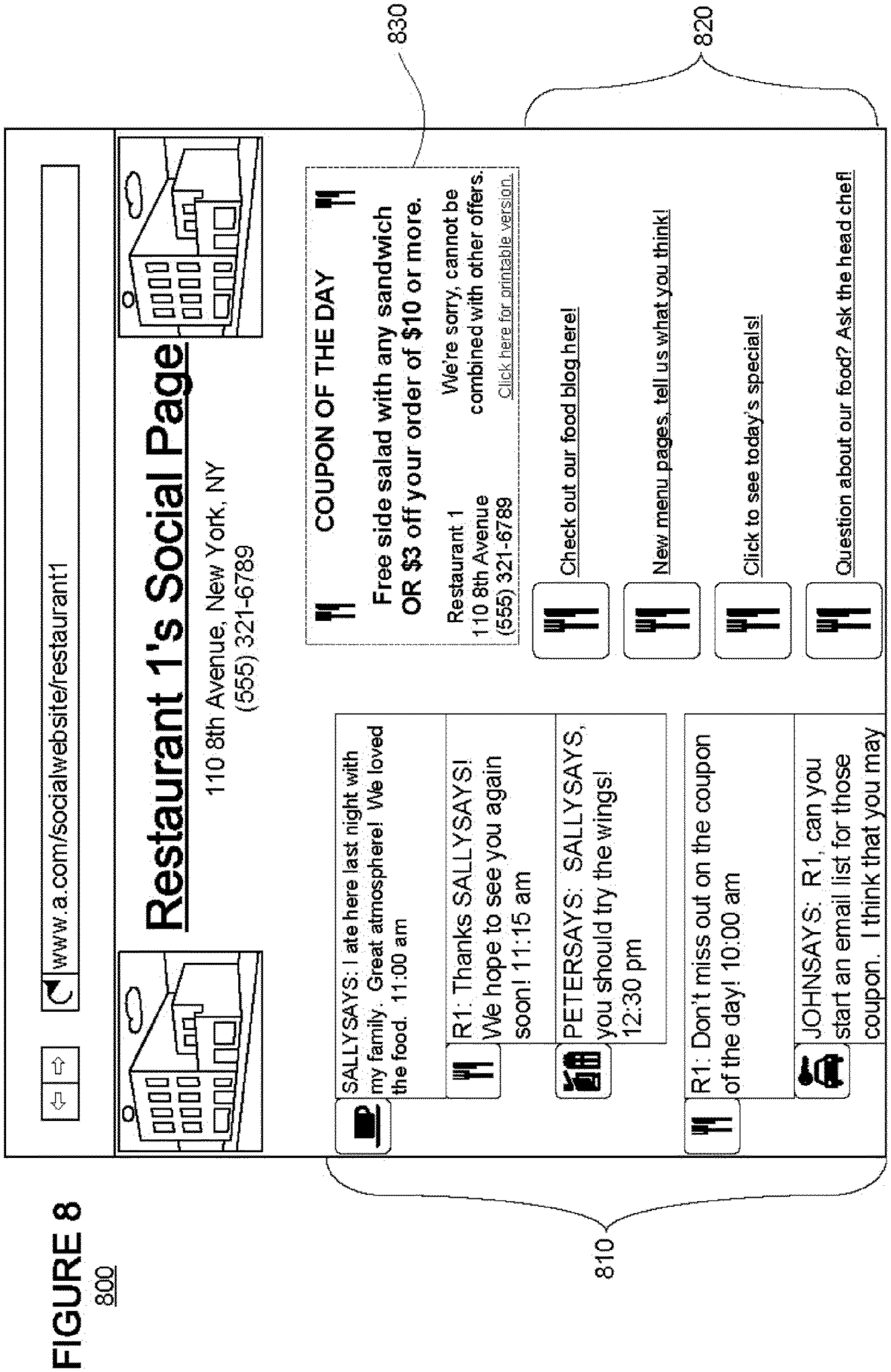
FIG. 8 is an exemplary screen shot in accordance with another aspect of the invention.

As shown in exemplary screen shot 800 of FIG. 8, Restaurant 1's social networking web site may include various types of content such as comments 810 posted by customers, links 820 to additional content, or other announcements. In the example, the web site also includes information announcing a coupon 830. "" The server may identify the coupon as relevant content related to the entity.

Figure 9:
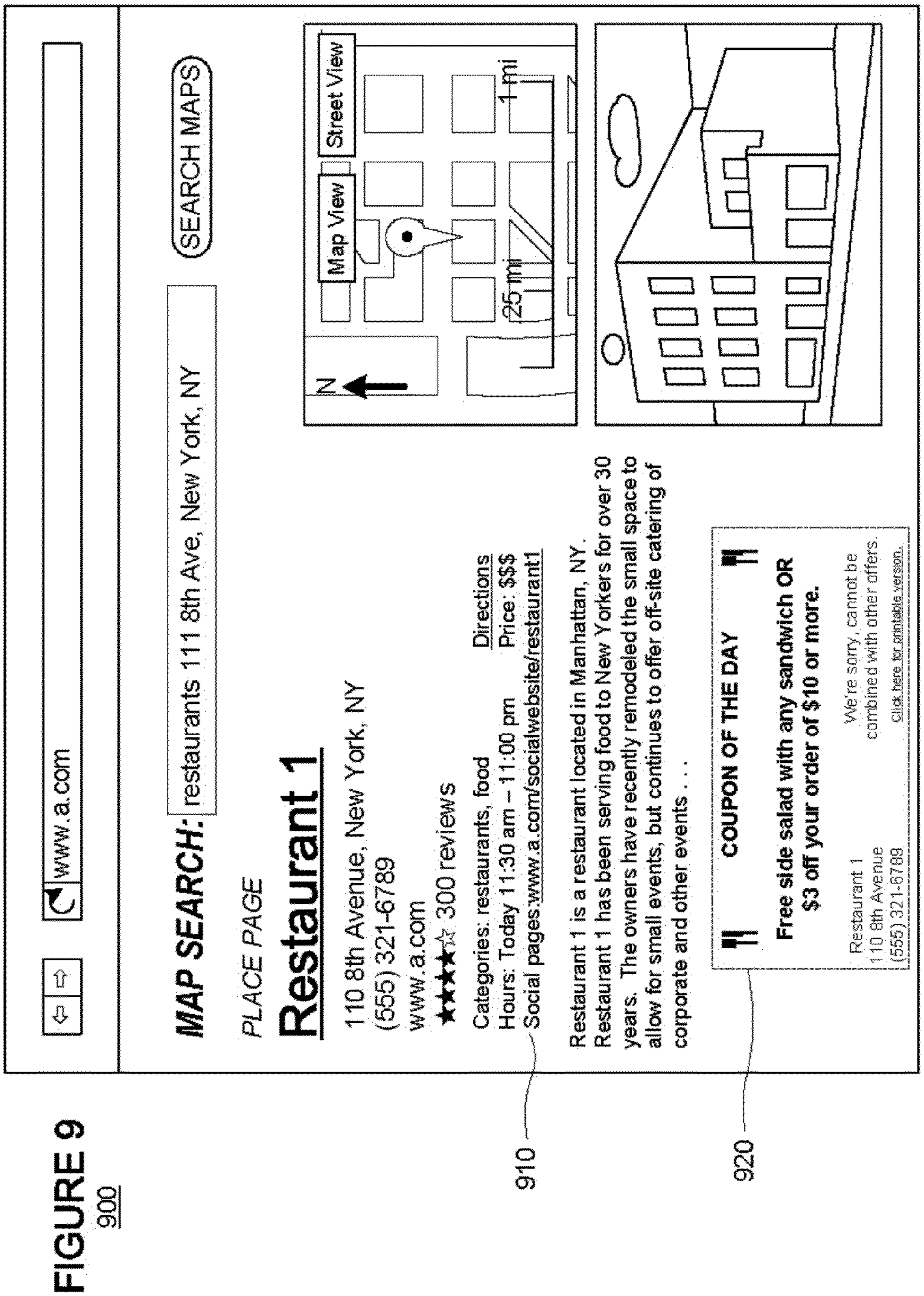
FIG. 9 is an exemplary flow diagram in accordance with aspects of the invention.

Once the server has identified relevant content, the server may transmit the content to the requesting client device to be displayed with the entity's place page. For example, as shown in exemplary screen shot 900 of FIG. 9, the client device may display the place page for Restaurant 1. In addition to the information previously displayed in FIG. 4, the place page now includes a hyperlink 910 to Restaurant 1's social networking web site as well as the content (in the form of coupon 920) identified by the server on Restaurant 1's social networking web site. This may allow the server to provide information directly to users as soon as it has been posted by an entity, such as a business.

Figure 10:
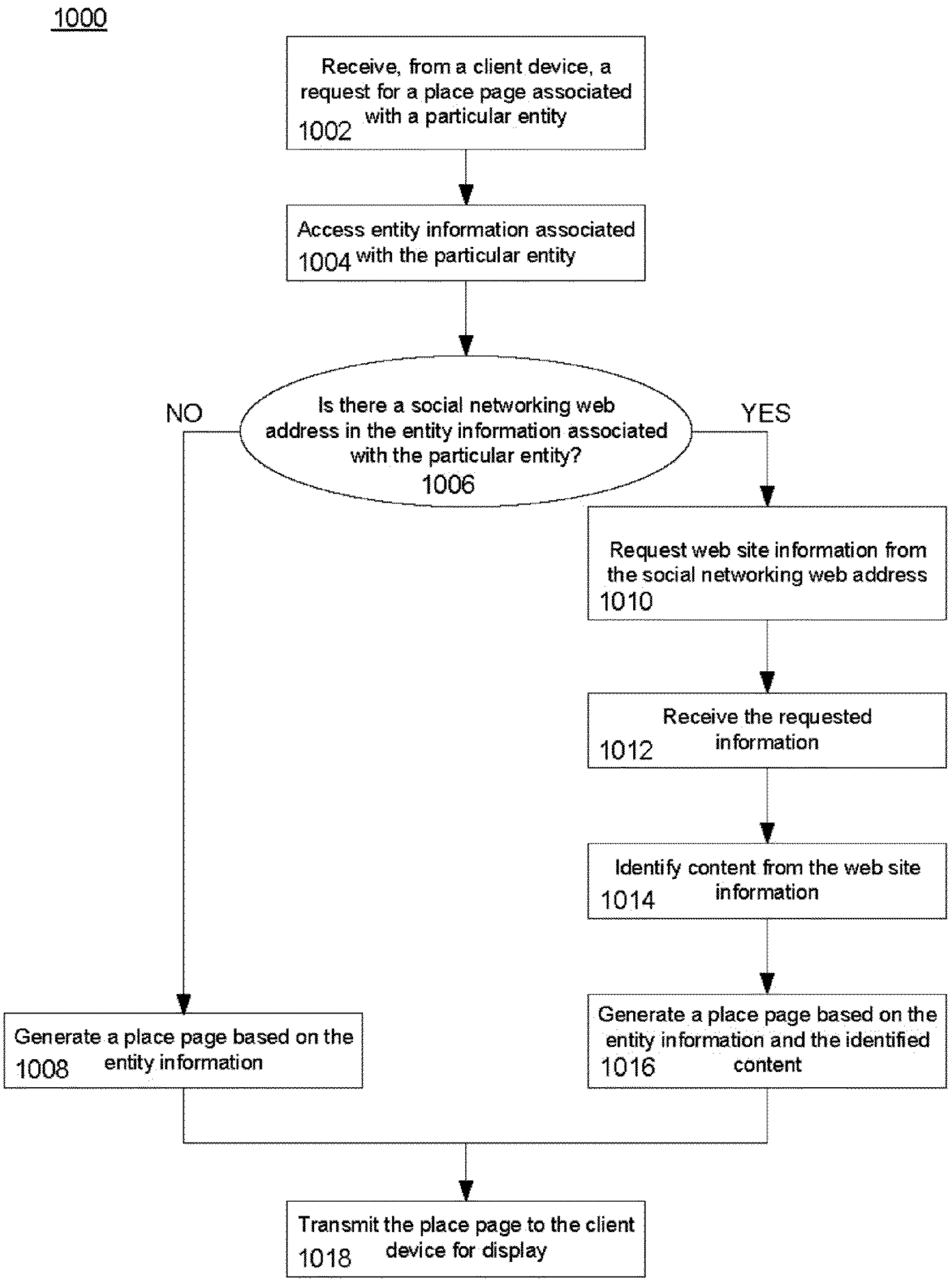
FIG. 10 is an exemplary flow diagram in accordance with aspects of the invention.

As shown in flow diagram 1000 of FIG. 10, the server receives, from a client device, a request for a place page associated with a particular entity at block 1002. The place page may provide various types of information, for example, by displaying information about the particular entity such as user reviews, contact information, etc. The server then accesses entity information associated with the particular entity at block 1004 such as by retrieving from entity information 136 of FIG. 1. The server then determines whether there is a social networking web address in the entity information associated with the particular entity (see e.g., block 724 of FIG. 7) at block 1006. If not, the server generates a place page based on the entity information at block 1008 and transmits the place page to the client device for display at block 1018.

If the entity information associated with the particular entity does include a social networking hyperlink to a web site, the server may request web site information from the social networking web address at block 1010. For example, the server may request a web site from a web server associated with the web address. In response, the server receives the requested information from the web server at block 1012. The server then identifies content from the received web site information such as announcements, coupons, or other information at block 1014. The server generates a place page based on the entity information and the identified content at blocks 1016 and 1018, respectively.

The server may also identify additional social networking web pages for a particular entity using a previously identified social networking web site as well as the web site formats described above. For example, if the server has identified www.a.com/socialwebsite/restaurant1 as a social networking web site for the entity Restaurant 1, the server may also determine that web sites which include one of the pre-determined social web site formats in conjunction with the name "restaurant1" are associated with Restaurant 1. In one example, if a second seed term is "socialpage" and the web service operated by "socialpage" generally uses the format "www.a.social.page.com/entity," the server may search the internet for the web site "www.a.socialpage.com/restaurant1." If this web site exists, the server may also associate the socialpage web site with the entity information of Restaurant 1. This social networking web site detection scan may be performed on a regular basis, such as once a month or once a week. Thus, if a web site is removed, a subsequent run of the detection scan will not find the web site. Accordingly the web site may be removed from the list of social networking web sites and the web site's associations with any particular entities removed as well.

When a user requests the place page for Restaurant 1 or prior to the request, similarly to the process described above with respect to FIG. 10, the server may scan the socialwebsite and/or the socialpage web site for content to be included in Restaurant 1's place page.

Figure 11:
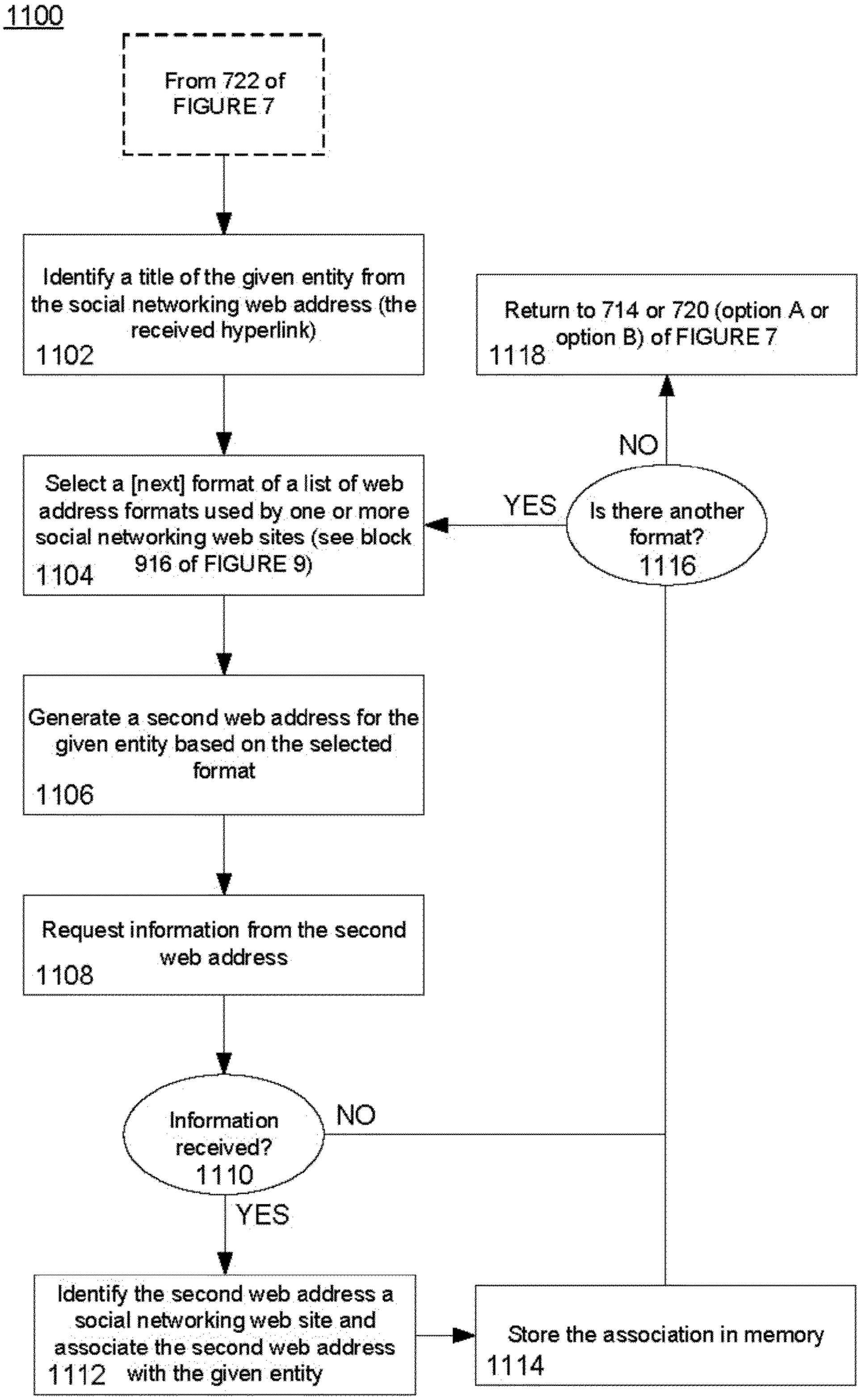
FIG. 11 is an exemplary flow diagram in accordance with aspects of the invention.

As shown in flow diagram 1100 of FIG. 11, once the server has identified a received hyperlink as a social networking hyperlink and associated the hyperlink with the given entity at block 722 of FIG. 7, the server identifies a title (or name) of the given entity from the social networking web address (formerly the received hyperlink) at block 1102. The server then selects a format of a list of web address formats used by one or more social networking web sites (see block 716 of FIG. 7) at block 1104. The server then generates a second web address for the given entity based on the selected format at block 1106. The server requests information (a web site) from the second web address at block 1108. The server then determine whether the web site exists, based on whether information is received from the second web address at block 1110. If no information is received, the server determines whether there is another format of the list of web address formats which has not been examined (see blocks 1106-1110) at block 1116. If so, the server returns to block 1104 to select the next format of the list of web address formats. If there are no remaining formats, the server returns to block 714 or 720 of FIG. 7 (depending on whether the server will use a list of terms or a list of web address formats, i.e. option A or option B), as shown in block 1118.

Returning to block 1110, if information is received from the second web address, the server identifies the second web address as a social networking web site and associates the second web address with the given entity at block 1112. The server then stores the association in memory at block 1114 and determines whether there is another format which has not been examined (as described above) at block 1116.

As these and other variations and combinations of the features discussed above can be utilized without departing from the invention as defined by the claims, the foregoing description of exemplary embodiments should be taken by way of illustration rather than by way of limitation of the invention as defined by the claims. It will also be understood that the provision of examples of the invention (as well as clauses phrased as “such as,” “e.g.”, “including” and the like) should not be interpreted as limiting the invention to the specific examples; rather, the examples are intended to illustrate only some of many possible aspects.

The invention claimed is:

1. A computer-implemented method of identifying a social networking address for a business entity in order to generate a place page for the business entity, the method comprising:

receiving entity information identifying the business entity, the entity information identifying a web address for the business entity;

requesting, from a web server, the web address for the business entity;

receiving data associated with the web address for the business entity, the data including a hyperlink to a second web address;

comparing, by a processor, text of the hyperlink to the second web address to a predetermined list of terms that have been used in web site addresses of one or more social networking web sites;

when the text of the hyperlink to the second web address includes a given term of the predetermined list of terms, identifying the second web address as the social networking address for the business entity;

generating the place page for the business entity using the entity information, the place page providing information about the business entity including the social networking address for the business entity;

identifying a title of the business entity;

selecting a format from a list of predetermined web address formats used by one or more social networking web sites;

generating a candidate social networking address for the business entity based on the selected format;

determining that the candidate social networking address for the business entity exists as a second social networking address for the business entity; and adding the second social networking address for the business entity to the place page for the business entity.

2. The method of claim 1, further comprising:

requesting the social networking address for the business entity from a second web server;

receiving data associated with the second social networking address, the received data including content associated with the business entity; and adding the content associated with the business entity received from the social networking address to the place page for the business entity.

3. The method of claim 1, further comprising:

requesting the second social networking address from a third web server;

receiving data associated with the second social networking address, the received data including second content associated with the business entity; and adding the second content to the place page for the business entity.

4. A computer for identifying a social networking address for a business entity in order to generate a place page for the business entity, the computer comprising:

memory storing entity information identifying a of the business entity, the entity information identifying a web address for the business entity, and the memory also storing a predetermined list of terms used in web site addresses of one or more social networking web sites;

a processor configured to:

request, from a web server, the web address for the business entity;

receive data associated with the web address for the business entity, the data including a hyperlink to a second web address;

comparing text of the hyperlink to the second web address to the predetermined list of terms;

when the text of the received hyperlink to the second web address includes a given term of the predetermined list of social networking terms, identify the second web address as the social networking address for the business entity;

generate the place page for the business entity using the entity information, the place page providing information about the business entity including the social networking address for the business entity;

identify a title of the business entity;

select a format from a list of predetermined web address formats used by one or more social networking web sites;

generate a candidate social networking address for the business entity based on the selected format;

determine that the candidate social networking address for the business entity exists as a second social networking address for the business entity; and add the second social networking address for the business entity to the place page for the business entity.

5. The computer of claim 4, wherein the processor is further configured to:

request the social networking address for the business entity from a second web server; and receive data associated with the second social networking address, the received data including content associated with the business entity; and adding the content associated with the business entity received from the social networking address to the place page for the business entity.

6. The computer of claim 4, wherein the processor is further configured to:

request the second social networking address from a third web server;

receive data associated with the second social networking address, the received data including second content associated with the business entity, wherein the place page is further; and add the second content to the place page for the business entity.

7. A computer-implemented method of identifying a social networking address for a business entity in order to generate a place page for the business entity, the method comprising:

receiving entity information identifying the business entity, including a title for the business entity;

selecting a format from a list of predetermined web address formats used by one or more social networking web sites;

generating a candidate social networking address for the given entity based on the selected format;

determining that the candidate social networking address for the business entity exists as a social networking address for the business entity; and generating the place page for the business entity using the received entity information, the place page providing information about the business entity including the social networking address for the business entity.

8. The method of claim 7, further comprising:

requesting the social networking address for the business entity from a second web server;

receiving data associated with the social networking address, the received data including content associated with the business entity; and adding the content associated with the business entity received from the social networking address to the place page for the business entity.

9. The method of claim 7, further comprising:

receiving a web address for the business entity;

requesting, from a web server, the web address for the business entity;

receiving data associated with the web address for the business entity, the data including a hyperlink to a second web address;

comparing, by a processor, text of the hyperlink to the second web address to a predetermined list of terms that have been used in web site addresses of one or more social networking web sites;

identifying the second web address as a second social networking address for the business entity when the text of the hyperlink to the second web address includes a given term of the predetermined list of social networking terms; and adding the second social networking address to the place page for the business entity.

10. The method of claim 9, further comprising:

requesting the second social networking address from a third web server;

receiving data associated with the second social networking address, the received data including second content associated with the business entity; and, adding the second content associated with the business entity to the place page for the business entity.

11. A system for identifying a social networking address for a business entity in order to generate a place page for the business entity, the system comprising:

a processor configured to:

receive entity information identifying the business entity, including a title for the business entity;

select a format from a list of predetermined web address formats used by one or more social networking web sites;

generate a candidate social networking address for the given entity based on the selected format;

determine that the candidate social networking address for the business entity exists as a social networking address for the business entity; and generate the place page for the business entity using the received entity information, the place page providing information about the business entity including the social networking address for the business entity.

12. The system of claim 11, wherein the processor is further configured to:

request the social networking address for the business entity from a second web server;

receive data associated with the social networking address, the received data including content associated with the business entity; and add the content associated with the business entity received from the social networking address to the place page for the business entity.

13. The computer of claim 12, wherein the processor is further configured to:

receive a web address for the business entity;

request, from a web server, the web address for the business entity;

receive data associated with the web address for the business entity, the data including a hyperlink to a second web address;

compare text of the hyperlink to the second web address to a predetermined list of terms that have been used in web site addresses of one or more social networking web sites;

identify the second web address as a second social networking address for the business entity when the text of the hyperlink to the second web address includes a given term of the predetermined list of social networking terms; and adding the second social networking address to the place page for the business entity.

14. The computer of claim 13, wherein the processor is further configured to:

request the second social networking address from a third web server;

receive data associated with the second social networking address, the received data including second content associated with the business entity; and, adding the second content associated with the business entity to the place page for the business entity.

* * * * *